United States Patent
Kanazawa

(10) Patent No.: US 10,262,246 B1
(45) Date of Patent: Apr. 16, 2019

(54) IMAGE FORMING APPARATUS, IMAGE FORMING METHOD, AND NON-TRANSITORY COMPUTER READABLE RECORDING MEDIUM

(71) Applicant: KYOCERA DOCUMENT SOLUTIONS INC., Osaka (JP)

(72) Inventor: Keizen Kanazawa, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/910,061

(22) Filed: Mar. 2, 2018

(51) Int. Cl.
*G06K 15/02* (2006.01)

(52) U.S. Cl.
CPC ..... *G06K 15/1834* (2013.01); *G06K 15/1802* (2013.01)

(58) Field of Classification Search
CPC .................................................... G06K 15/02
See application file for complete search history.

(56) References Cited

U.S. PATENT DOCUMENTS

2001/0033285 A1* 10/2001 Okuno ............... G06F 17/218
 345/467
2007/0226611 A1* 9/2007 Sugimoto ........... G06F 17/212
 715/210

FOREIGN PATENT DOCUMENTS

JP 2001-071568 A 3/2001
JP 2002-200796 A 7/2002

\* cited by examiner

*Primary Examiner* — Frantz Bataille
(74) *Attorney, Agent, or Firm* — Li & Cai Intellectual Property (USA) Office

(57) ABSTRACT

An image forming apparatus includes: a communication interface that receives printable data including a character code from a host device; a memory that stores a character code attribute table recording the character code, the character code attribute table being configured to record a rendering attribute in association with the character code; and a processor that executes an information processing program to operate as a rendering module, in which the rendering module is configured to render a character identified by the character code in the printable data on a basis of the rendering attribute recorded in association with the character code in the character code attribute table to generate rendering data.

15 Claims, 5 Drawing Sheets

| Character Code | Arial | | | | |
|---|---|---|---|---|---|
| | Attribute | | | | |
| | RGB | Italic | Bold | Size | |
| 0x00 | None | None | None | None | ⎫ 215 |
| 0x01 | None | None | None | None | |
| ... | ... | ... | ... | ... | |
| 0x30 | 255,0,0 | None | True | 12point | |
| 0x31 | 255,0,0 | None | True | 12point | |
| 0x32 | 255,0,0 | None | True | 12point | |
| 0x33 | 255,0,0 | None | True | 12point | |
| 0x34 | 255,0,0 | None | True | 12point | 211 Numeral |
| 0x35 | 255,0,0 | None | True | 12point | |
| 0x36 | 255,0,0 | None | True | 12point | |
| 0x37 | 255,0,0 | None | True | 12point | |
| 0x38 | 255,0,0 | None | True | 12point | |
| 0x39 | 255,0,0 | None | True | 12point | |
| ... | ... | ... | ... | ... | |
| 0x41 | 0,0,0 | None | False | 10point | |
| 0x42 | 0,0,0 | None | False | 10point | |
| 0x43 | 0,0,0 | None | False | 10point | 212 Alphabet (Capital letter) |
| ... | ... | ... | ... | ... | |
| 0x58 | 0,0,0 | None | False | 10point | |
| 0x59 | 0,0,0 | None | False | 10point | |
| 0x5A | 0,0,0 | None | False | 10point | |
| 0x5B | None | None | None | None | 215 |
| 0x5C | 255,0,0 | None | True | 12point | 213 Yen (¥) mark |
| 0x5D | None | None | None | None | 215 |
| ... | ... | ... | ... | ... | |
| 0x61 | 0,0,0 | None | False | 10point | |
| 0x62 | 0,0,0 | None | False | 10point | |
| 0x63 | 0,0,0 | None | False | 10point | 214 Alphabet (Small letter) |
| ... | ... | ... | ... | ... | |
| 0x78 | 0,0,0 | None | False | 10point | |
| 0x79 | 0,0,0 | None | False | 10point | |
| 0x7A | 0,0,0 | None | False | 10point | |
| ... | ... | ... | ... | ... | |
| 0xFE | None | None | None | None | ⎫ 215 |
| 0xFF | None | None | None | None | |

FIG.3

IMAGE FORMING APPARATUS, IMAGE FORMING METHOD, AND NON-TRANSITORY COMPUTER READABLE RECORDING MEDIUM

BACKGROUND OF THE INVENTION

1. Field of the Invention

The present disclosure relates to an image forming apparatus that renders characters identified by character codes in printable data, an image forming method, and a non-transitory computer readable recording medium that records an information processing program.

2. Description of Related Art

There is known an image forming apparatus that renders characters identified by character codes in printable data received from a host device on a basis of rendering attributes (RGB, bold, italic, size, etc.) in the printable data.

SUMMARY OF THE INVENTION

According to an embodiment of the present disclosure, there is provided an image forming apparatus including:

a communication interface that receives printable data including a character code from a host device;

a memory that stores a character code attribute table recording the character code, the character code attribute table being configured to record a rendering attribute in association with the character code; and a processor that executes an information processing program to operate as a rendering module, in which the rendering module is configured to render a character identified by the character code in the printable data on a basis of the rendering attribute recorded in association with the character code in the character code attribute table to generate rendering data.

According to an embodiment of the present disclosure, there is provided an image forming method executed by an image forming apparatus including a communication interface that receives printable data including a character code from a host device, a memory that stores a character code attribute table recording the character code, the character code attribute table being configured to record a rendering attribute in association with the character code, and a processor that executes an information processing program, the image forming method, including:

rendering a character identified by the character code in the printable data on a basis of the rendering attribute recorded in association with the character code in the character code attribute table to generate rendering data.

According to an embodiment of the present disclosure, there is provided a non-transitory computer readable recording medium that records an information processing program executable by a processor of an image forming apparatus including a communication interface that receives printable data including a character code from a host device, a memory that stores a character code attribute table recording the character code, the character code attribute table being configured to record a rendering attribute in association with the character code, and the processor, the information processing program causing the processor to operate as a rendering module, in which the rendering module is configured to render a character identified by the character code in the printable data on a basis of the rendering attribute recorded in association with the character code in the character code attribute table to generate rendering data.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 shows an example of a structure of the character code attribute table;

DETAILED DESCRIPTION OF THE PREFERRED EMBODIMENTS

Hereinafter, an embodiment of the present disclosure will be described with reference to the drawings.

1. Hardware Configuration of Image Forming Apparatus

Figure 1:
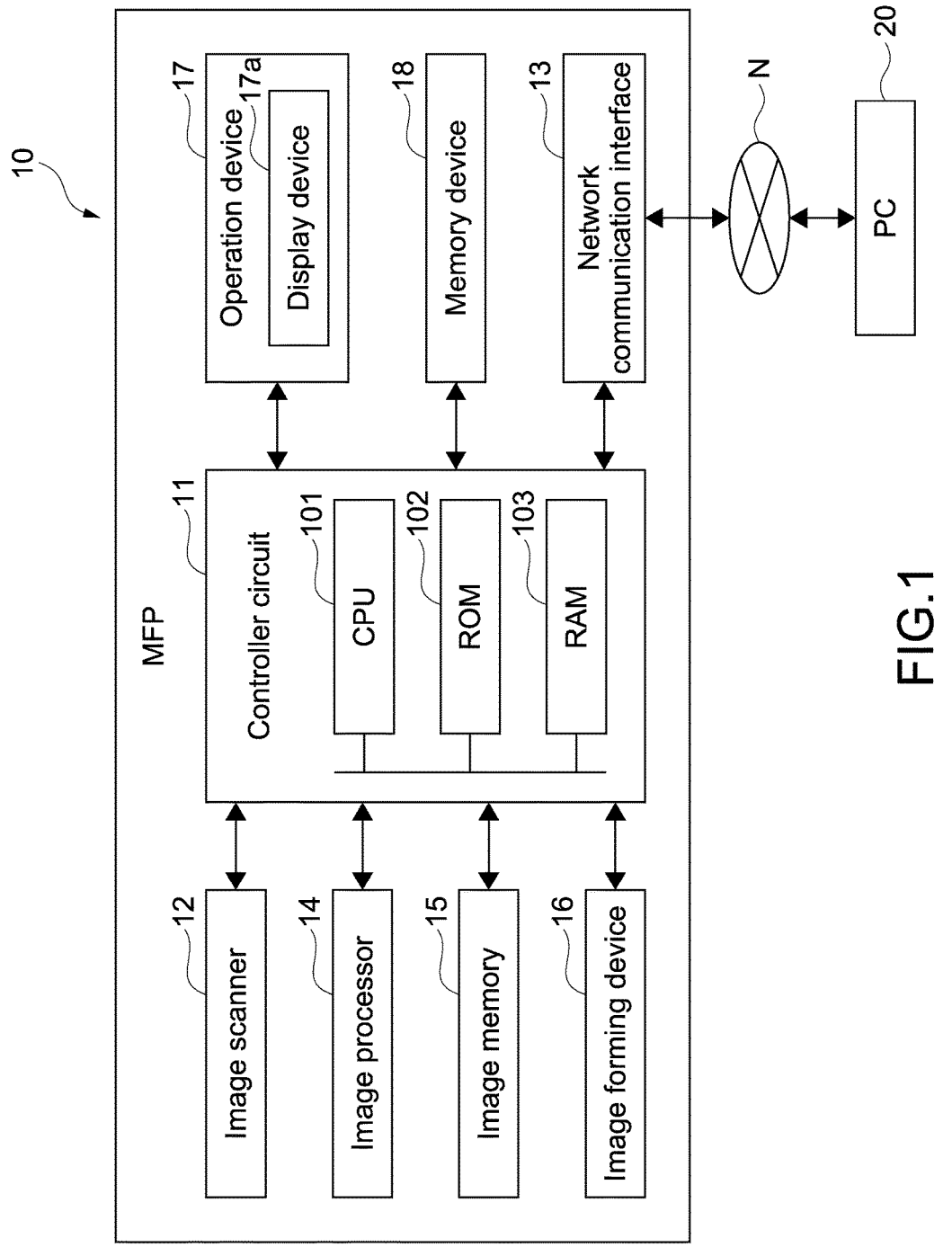
FIG. 1 shows a hardware configuration of an image forming apparatus of an embodiment of the present disclosure.

FIG. 1 shows a hardware configuration of an image forming apparatus of an embodiment of the present disclosure.

In the present the present embodiment, an image forming apparatus is an MFP (Multifunction Peripheral) and will be referred to as an MFP hereinafter.

The MFP 10 includes a controller circuit 11. The controller circuit 11 includes a CPU (Central Processing Unit) 101 (processor), a ROM (Read Only Memory) 102, a RAM (Random Access Memory) 103, dedicated hardware circuits, and the like and controls overall operations of the MFP 10. An information processing program that causes the MFP 10 to operate as the respective functional units (to be described later) is stored in a non-transitory computer readable recording medium such as the ROM 102.

The controller circuit 11 is connected to an image scanner 12, an image processor 14, an image memory 15, an image forming device 16, an operation device 17, a memory device 18, a the network communication interface 13, and the like. The controller circuit 11 performs operational control of the respective devices connected thereto and sends/receives signals and data to/from those devices.

According to job execution instructions input by a user via the operation device 17 or the host device 20 such as a personal computer connected to a network N, the controller circuit 11 controls drive and processing of mechanisms requisite for executing operational control of functions such as an image scanner function, a printing function, and a copy function.

The image scanner 12 captures an image of a document.

The image processor 14 carries out image processing as necessary on image data of an image captured by the image scanner 12. For example, the image processor 14 corrects shading of an image captured by the image scanner 12 and carries out other image processing to improve the quality of the image to be formed.

The image memory 15 includes an area that temporarily stores data of a document image captured by the image scanner 12 or data to be printed by the image forming device 16.

The image forming device 16 forms an image of image data and the like captured by the image scanner 12.

The operation device 17 includes a touch panel device and an operation key device that accept user's instructions on various operations and processing executable by the MFP 10. The touch panel device includes a display device 17a such as an LCD (Liquid Crystal Display) equipped with a touch panel.

The network communication interface 13 is an interface used for connecting to the network N such as the Internet and a LAN (Local Area Network). The network communication interface 13 communicates with the host device 20 via the network N.

The memory device 18 is a large-volume storage device such as an HDD (Hard Disk Drive) that stores a document image captured by the image scanner 12, and the like.

2. Functional Configuration of Image Forming Apparatus

Figure 2:
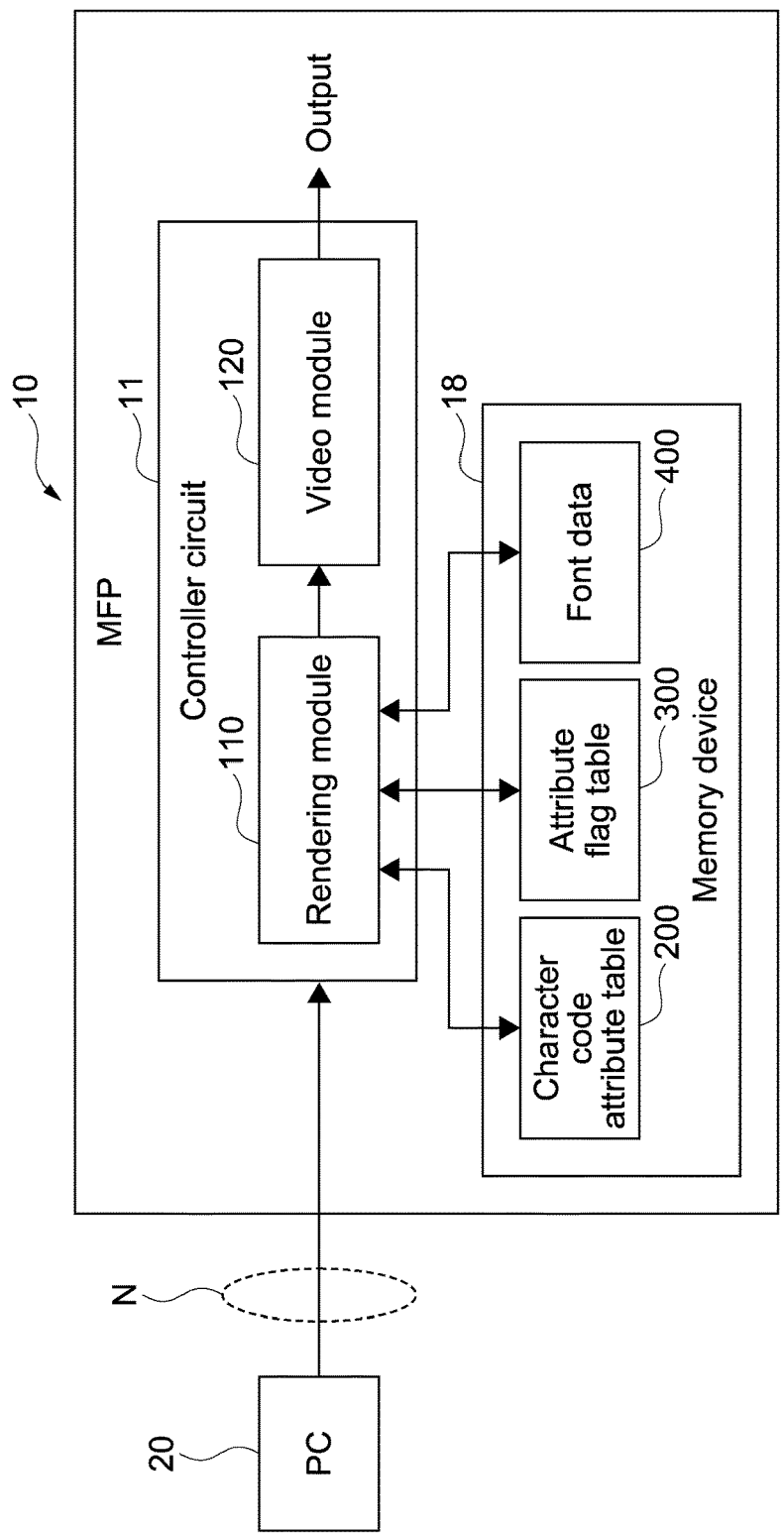
FIG. 2 shows a functional configuration of the image forming apparatus.

FIG. 2 shows a functional configuration of the image forming apparatus.

The memory device 18 stores the character code attribute tables 200, the attribute flag table 300, and the font data 400.

The character code attribute tables 200 (specific example will be described later) correspond to a plurality of types of font data 400 (not downloaded fonts but resident fonts) one by one. For example, the memory device 18 stores one character code attribute table 200 of the font "Arial", and another character code attribute table 200 of the font "CG Times". The character code attribute table 200 records character codes uniquely identifying a number of characters of the font one by one. Further, the character code attribute table 200 is configured to record rendering attributes in association with the character codes. The "rendering attributes" means attributes (RGB, bold, italic, size, etc.) for rendering characters.

The attribute flag table 300 (specific example will be described later) indicates, by using a flag (True/False), whether the character code attribute table 200 of each font records rendering attributes or not.

By the way, rendering attributes of the character code attribute table 200 may be preset by using the host device 20 or the operation device 17 (touch panel device). When rendering attributes are recorded in the character code attribute table 200, a flag (True), which indicates that the rendering attributes are recorded, may also be recorded (automatically or manually) in the attribute flag table 300.

The font data 400 is resident font data (for example, True Type font) used to render each font.

The CPU 101 of the controller circuit 11 loads an information processing program recorded in the ROM 102 in the RAM 103 and executes the information processing program to thereby operate as the rendering module 110 and the video module 120.

The rendering module 110 is an interpreter that interprets printable data received from the host device 20 via the network communication interface 13, and renders characters on a basis of the printable data. In detail, the rendering module 110 refers to the attribute flag table 300, and determines whether rendering attributes are recorded for a font specified in the printable data or not. Where the rendering module 110 determines that rendering attributes are recorded, the rendering module 110 renders characters by using the font data 400 on a basis of the rendering attribute recorded in the character code attribute table 200 of that font. In this manner, the rendering module 110 generates bitmap data. The rendering module 110 supplies the generated bitmap data to the video module 120. How the rendering module 110 operates will be described in detail later with reference to a flowchart.

The video module 120 forms images of characters on paper on a basis of the bitmap data obtained from the rendering module 110.

3. Structure of Character Code Attribute Table

FIG. 3 shows an example of a structure of the character code attribute table.

The character code attribute table 200 of the font "Arial" records the character codes 210 and the rendering attributes 220 in association with each other for the font "Arial" 201.

The character codes 210 uniquely identify all the characters of the font "Arial" 201 one-to-one. In detail, the character codes "0x30" to "0x39" identify the numerals 211 one-to-one. The character codes "0x41" to "0x5A" identify the alphabets (capital letters) 212 one-to-one. The character code "0x5C" identifies the yen (¥) mark 213. The character codes "0x61" to "0x7A" identify the alphabets (small letters) 214 one-to-one.

The rendering attributes 220 include the RGB 221, the italic 222, the bold 223, and the size 224.

In the RGB 221, "255, 0, 0" specifies red. "0, 0, 0" specifies black.

In the bold 223, "True" specifies bold. "False" specifies non-bold.

In the size 224, each of "12 point" and "10 point" specifies the character size.

In the RGB 221, the italic 222, the bold 223, and the size 224, "None" means non-specified. In short, if the rendering attributes are "None", rendering attributes specified in printable data are used if specified, and general rendering attributes are used if rendering attributes are not specified in printable data, without depending on the character code attribute table 200.

A specific example will be described. As the rendering attributes 220, the RGB 221 "255, 0, 0", the italic 222 "None", the bold 223 "True", and the size 224 "12 point" are in association with the character codes "0x30" to "0x39" identifying the numerals 211 and the character code "0x5C" identifying the yen (¥) mark 213. It means that the numerals and the yen (¥) mark are to be rendered with the rendering attributes of red, bold, and 12 point (true/false of italic is on a basis of rendering attribute specified in printable data).

As the rendering attributes 220, the RGB 221 "0, 0, 0", the italic 222 "None", the bold 223 "False", and the size 224 "10 point" are in association with the character codes "0x41" to "0x5A" identifying the alphabets (capital letters) 212 and the character codes "0x61" to "0x7A" identifying the alphabets (small letters) 214. It means that the alphabets (capital letters and small letters) are to be rendered with the rendering attributes of black, non-bold, and 10 point (true/false of italic is on a basis of rendering attribute specified in printable data).

"None" is in association with all the rendering attributes 220 of the character codes "0x00", "0x01", "0x5B", "0x5D", "0xFE", and "0xFF" 215. It means that rendering attributes specified in printable data are used if specified, and general rendering attributes are used if rendering attributes are not specified in printable data for the characters identified by the character codes 215.

4. Structure of Character Code Attribute Table

Figure 4:
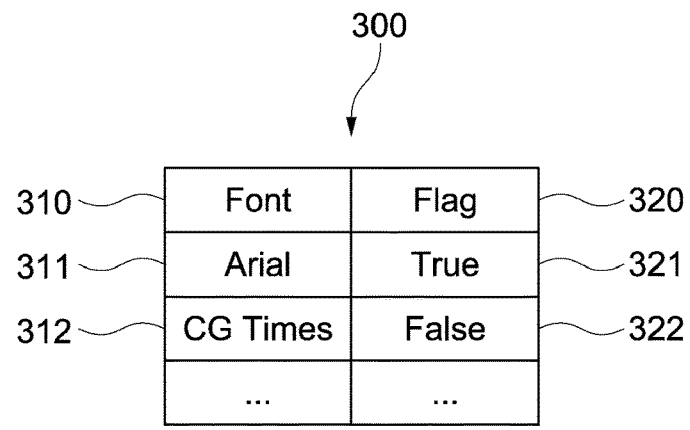
FIG. 4 shows an example of the attribute flag table.

FIG. 4 shows an example of the attribute flag table.

The attribute flag table 300 indicates, by using the flag 320, whether the character code attribute table 200 of each font 310 records rendering attributes or not. In detail, the flag "True" 321 is in association with the font "Arial" 311. It means that rendering attributes are recorded in the character code attribute table 200 of the font "Arial". The flag "False" 322 is in association with the font "CG Times" 312. It means that no rendering attribute is recorded in the character code attribute table 200 of the font "CG Times".

5. Operational Flow of Rendering Module

Figure 5:
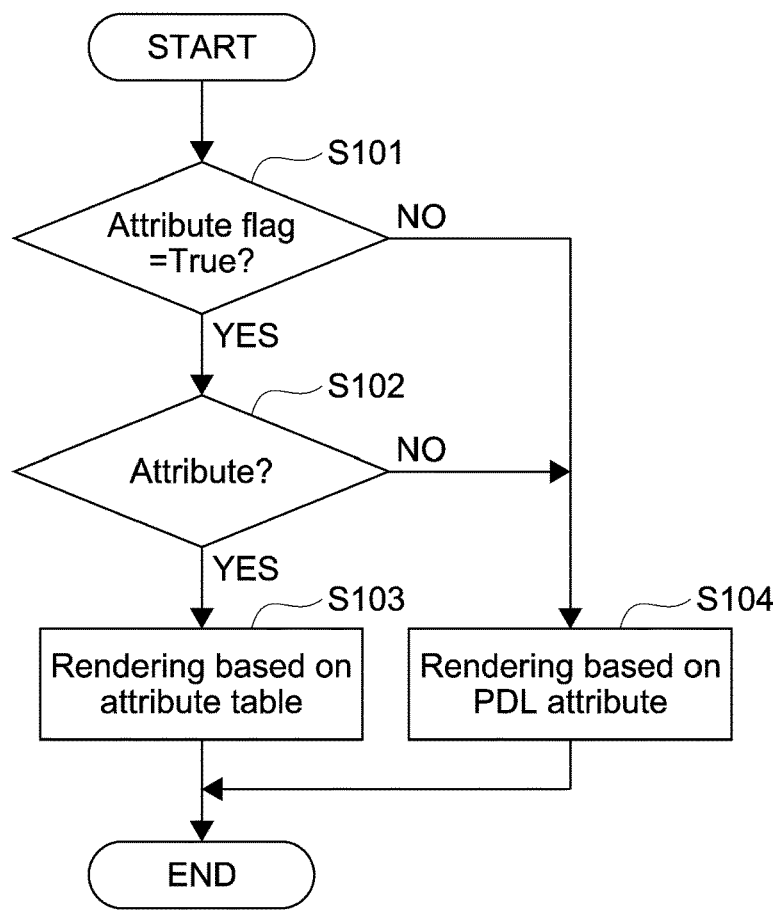
FIG. 5 shows an operational flow of the rendering module.

FIG. 5 shows an operational flow of the rendering module.

The MFP 10 receives printable data via the network communication interface 13 from the host device 20 connected to the network N. The printable data is described in, for example, PDL (Page Description Language). The printable data includes information specifying a font (CG Times, Arial, etc.) to be output, and character codes. The printable data may or may not further include rendering attributes. The printable data may specify one font type or two or more font types. If the printable data specifies two or more font types, the rendering module 110 executes the operational flow for each font, again and again.

The rendering module 110 determines whether the character code attribute table 200 of the font, which is specified in the printable data from the host device 20, records rendering attributes or not (Step S101). In detail, the rendering module 110 refers to the attribute flag table 300. Where the flag 320 "True" is in association with the font 310 specified in the printable data, the rendering module 110 determines that the character code attribute table 200 of that font records rendering attributes (Step S101, YES).

Next, the rendering module 110 refers to the character code attribute table 200 of that font (the character code attribute table 200 records rendering attributes of that font). The rendering module 110 refers to the character code attribute table 200, and determines whether the rendering attributes 220 are recorded in association with each of all the character codes 210, which are included in the printable data and for which that font is specified, or not (Step S102). In detail, if at least one value other than "None" is recorded as the rendering attribute 220 in association with a certain character code 210, the rendering module 110 determines that the rendering attribute 220 is recorded in association with that character code 210 (Step S102, YES).

The rendering module 110 renders a character identified by that character code by using the font data 400 on a basis of the rendering attributes 220 recorded in association with that character code 210 in the character code attribute table 200, and thereby generates rendering data (bitmap data). The rendering module 110 outputs the generated rendering data (bitmap data) to the video module 120 (Step S103). By the way, even if printable data includes rendering attributes, the rendering module 110 generates rendering data not on a basis of the rendering attributes in the printable data but preferentially on a basis of the rendering attributes 220 recorded in the character code attribute table 200.

Meanwhile, where the flag 320 "False" is in association with the font 310 specified in the printable data, the rendering module 110 determines that the character code attribute table 200 of that font records no rendering attribute (Step S101, NO). Alternatively, if "None" is recorded as all the rendering attributes 220 in association with a certain character code 210, the rendering module 110 determines that no rendering attribute 220 is recorded in association with that character code 210 (Step S102, NO). In those cases, the rendering module 110 renders a character identified by that character code by using the font data 400 on a basis of the rendering attributes in the printable data, and thereby generates rendering data (bitmap data). The rendering module 110 outputs the generated rendering data (bitmap data) to the video module 120 (Step S104).

6. Specific Example

Figure 6:
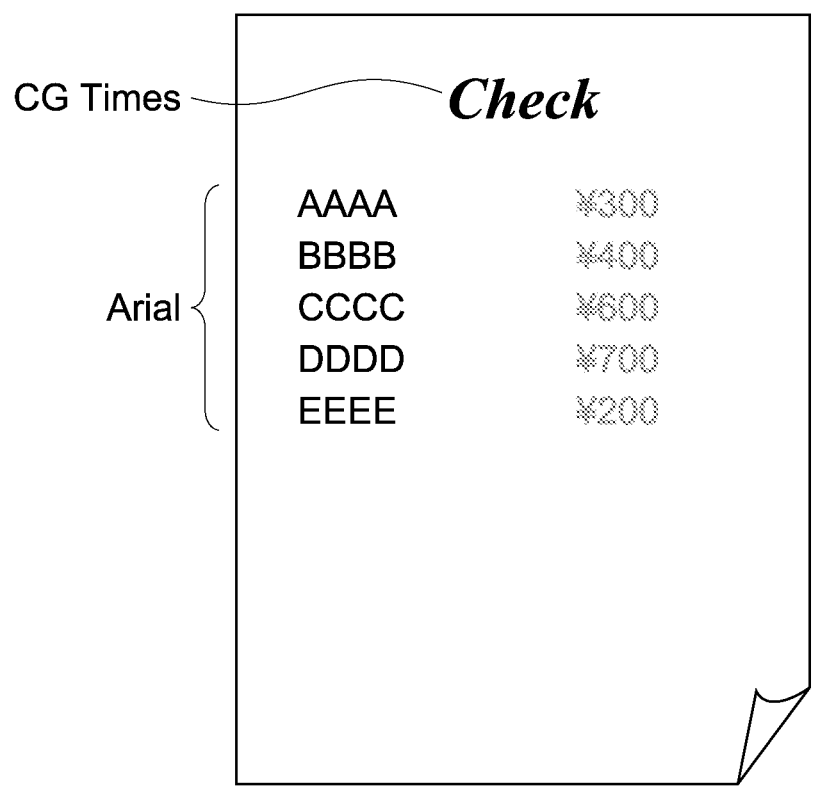
FIG. 6 shows a specific example of rendering data generated by the rendering module.

FIG. 6 shows a specific example of rendering data generated by the rendering module.

In this specific example, printable data includes an instruction to render characters "Check" (which are in fact described in character codes) in the font "CG Times" on a basis of the rendering attributes "italic, bold, and 16 point". The printable data further includes an instruction to render characters "AAAA", "BBBB", "CCCC", "DDDD", "EEEE", "¥300", "¥400", "¥600", "¥700", and "¥200" (which are in fact described in character codes) in the font "Arial" (rendering attributes may or may not be specified).

In this specific example, the character code attribute table 200 of FIG. 3 and the attribute flag table 300 of FIG. 4 are used.

With reference to the attribute flag table 300, since "False" 322 of the flag 320 is in association with the font "CG Times" 312 specified in the printable data, the rendering module 110 determines that the character code attribute table 200 of the font "CG Times" records no rendering attribute (Step S101, NO). Then the rendering module 110 renders the characters "Check", for which the font "CG Times" is specified in the printable data, by using the font data 400 on a basis of the rendering attributes "italic, bold, and 16 point" in the printable data (Step S104).

Meanwhile, with reference to the attribute flag table 300, since "True" 321 of the flag 320 is in association with the font "Arial" 311 specified in the printable data, the rendering module 110 determines that the character code attribute table 200 of the font "Arial" records rendering attributes (Step S101, YES).

The rendering module 110 refers to the character code attribute table 200 of the font "Arial". The rendering module 110 reads, as the rendering attributes 220, the RGB 221 "0, 0, 0", the italic 222 "None", the bold 223 "False", and the size 224 "10 point" in association with the character codes 212 identifying the characters "AAAA", "BBBB", "CCCC", "DDDD", and "EEEE". The rendering module 110 reads, as the rendering attributes 220, the RGB 221 "255, 0, 0", the italic 222 "None", the bold 223 "True", and the size 224 "12 point" in association with the character codes 211 and 213 identifying the characters "¥300", "¥400", "¥600", "¥700", and "¥200" (Step S102, YES).

The rendering module 110 renders the characters "AAAA", "BBBB", "CCCC", "DDDD", and "EEEE" with the rendering attributes of black, non-bold, and 10 point (true/false of italic is on a basis of rendering attribute specified in printable data) on a basis of the rendering attributes 220 in association with the character codes 212 recorded in the character code attribute table 200. The rendering module 110 renders the characters "¥300", "¥400", "¥600", "¥700", and "¥200" with the rendering attributes of red, bold, and 12 point (true/false of italic is on a basis of rendering attribute specified in printable data) on a basis of the rendering attributes 220 in association with the character codes 211 and 213 recorded in the character code attribute table 200 (Step S103).

7. Conclusion

An image forming apparatus receives printable data including character codes from a host device, and renders characters on a basis of the printable data. Typically, a character code attribute table stored in the image forming apparatus only records character information (outline information, width and height of character, character spacing, etc.) in association with character codes. In other words, if printable data only includes character codes, the image forming apparatus can only render those characters only on a basis of the character information (outline information, width and height of character, character spacing, etc.). From that viewpoint, printable data should include not only character codes but also rendering attributes in order to render characters on a basis of various rendering attributes (RGB, bold, italic, size, etc.).

By the way, in some cases, it may be necessary to render particular kinds of characters with particular rendering attributes. For example, in formatted documents and the like, alphabets may be rendered with general attributes (for example, black, non-bold, normal size), and yen (¥) mark and numerals may be rendered with red, bold, and a larger size. Typically, every time a formatted document or the like having such a fixed style is to be printed, a user operates a host device, and the host device sets rendering attributes for printable data. However, it is troublesome for a user to operate the host device to generate printable data every time the formatted document is to be printed. In addition, since the printable data includes the rendering attributes, the data size of the printable data is large.

In view of the aforementioned circumstances, firstly, according to the present embodiment, the character code attribute table 200 stored in the MFP 10 is configured to record the rendering attributes 220 in association with the character codes 210. The rendering module 110 renders characters identified by the character codes in the printable data on a basis of the rendering attributes 220 recorded in association with the character codes 210 in the character code attribute table 200 to generate rendering data.

According to the present embodiment, characters can be rendered on a basis of desired rendering attributes without setting rendering attributes for printable data by the host device 20. Since the host device 20 does not need to set rendering attributes for printable data, it will save a user's trouble, printable data can be generate in a shorter time, and the data size of the printable data can be reduced.

Secondly, according to the present embodiment, the rendering module 110 refers to the attribute flag table 300, and determines whether the character code attribute table 200 records the rendering attributes 220 or not. So, if the rendering module 110 determines that the character code attribute table 200 records no rendering attribute 220, then the rendering module 110 skips to read the rendering attributes 220 from the character code attribute table 200 when rendering characters. As a result, the process may be simple and the processing speed may be increased.

Thirdly, according to the present embodiment, if the printable data includes rendering attributes, the rendering module 110 renders the characters identified by the character codes 210, which are in association with no rendering attribute 220, on a basis of the rendering attribute in the printable data. As a result, characters identified by the character codes 210, which are in association with no rendering attribute 220, can be rendered on a basis of rendering attributes depending on a user's need.

Fourthly, according to the present embodiment, even if printable data includes rendering attributes, the rendering module 110 generates rendering data not on a basis of the rendering attributes in the printable data but preferentially on a basis of the rendering attributes 220 recorded in the character code attribute table 200. As a result, even if a user, who is not used to creating a formatted document or the like, specifies rendering attributes for printable data by mistake, characters can be rendered in a fixed style.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
  a communication interface that receives printable data including a character code from a host device;
  a memory that stores a character code attribute table recording the character code, the character code attribute table being configured to record a rendering attribute in association with the character code; and
  a processor that executes an information processing program to operate as a rendering module, wherein
  the rendering module is configured to render a character identified by the character code in the printable data on a basis of the rendering attribute recorded in association with the character code in the character code attribute table to generate rendering data, and
  wherein the rendering module is further configured to
    determine whether the character code attribute table records the rendering attribute or not,
    where the rendering module determines that the character code attribute table records the rendering attribute, render the character identified by the character code on a basis of the rendering attribute recorded in the character code attribute table, and
    where the rendering module determines that the character code attribute table records no rendering attribute, and where the printable data further includes a rendering attribute, render the character identified by the character code on a basis of the rendering attribute in the printable data.

2. The image forming apparatus according to claim 1, wherein
  the memory stores the character code attribute table of each of a plurality of fonts,
  the printable data specifies one or more fonts, and
  the rendering module is configured to
    determine whether the character code attribute table of each of the one or more fonts specified in the printable data records the rendering attribute or not,
    where the rendering module determines that the character code attribute table of a particular font records the rendering attribute, render the character identified by the character code, to which the particular font is specified, on a basis of the rendering attribute recorded in the character code attribute table, and where the rendering module determines that the character code attribute table of another font records no rendering attribute, and where the printable data further includes a rendering attribute, render the character identified by the character code, to which the another font is specified, on a basis of the rendering attribute in the printable data.

3. The image forming apparatus according to claim 1, wherein the character code attribute table
records the rendering attribute in association with some character codes, and
records no rendering attribute in association with other character codes, and the rendering module is configured to
render a character identified by the character code in association with the rendering attribute on a basis of the rendering attribute recorded in the character code attribute table, and
where the printable data further includes a rendering attribute, render a character identified by the character code in association with no rendering attribute on a basis of the rendering attribute in the printable data.

4. The image forming apparatus according to claim 1, wherein the rendering module is configured to, where the printable data further includes a rendering attribute, generate the rendering data not on a basis of the rendering attribute in the printable data but on a basis of the rendering attribute recorded in the character code attribute table.

5. The image forming apparatus according to claim 1, wherein the processor further operates as a video module configured to form an image on a basis of the rendering data generated by the rendering module.

6. An image forming method executed by an image forming apparatus including a communication interface that receives printable data including a character code from a host device,
a memory that stores a character code attribute table recording the character code, the character code attribute table being configured to record a rendering attribute in association with the character code, and
a processor that executes an information processing program, the image forming method, comprising:
rendering a character identified by the character code in the printable data on a basis of the rendering attribute recorded in association with the character code in the character code attribute table to generate rendering data, wherein the image forming method further comprises:
determining whether the character code attribute table records the rendering attribute or not;
where it is determined that the character code attribute table records the rendering attribute, rendering the character identified by the character code on a basis of the rendering attribute recorded in the character code attribute table; and
where it is determined that the character code attribute table records no rendering attribute, and where the printable data further includes a rendering attribute, rendering the character identified by the character code on a basis of the rendering attribute in the printable data.

7. The image forming method according to claim 6, wherein the memory stores the character code attribute table of each of a plurality of fonts,
the printable data specifies one or more fonts, and
the method further comprises:
determining whether the character code attribute table of each of the one or more fonts specified in the printable data records the rendering attribute or not;
where it is determined that the character code attribute table of a particular font records the rendering attribute, rendering the character identified by the character code, to which the particular font is specified, on a basis of the rendering attribute recorded in the character code attribute table; and
where it is determined that the character code attribute table of another font records no rendering attribute, and where the printable data further includes a rendering attribute, rendering the character identified by the character code, to which the another font is specified, on a basis of the rendering attribute in the printable data.

8. The image forming method according to claim 6, wherein the character code attribute table
records the rendering attribute in association with some character codes, and
records no rendering attribute in association with other character codes, and the method further comprises:
rendering a character identified by the character code in association with the rendering attribute on a basis of the rendering attribute recorded in the character code attribute table, and
where the printable data further includes a rendering attribute, rendering a character identified by the character code in association with no rendering attribute on a basis of the rendering attribute in the printable data.

9. The image forming method according to claim 6, further comprising:
where the printable data further includes a rendering attribute, generating the rendering data not on a basis of the rendering attribute in the printable data but on a basis of the rendering attribute recorded in the character code attribute table.

10. The image forming method according to claim 6, further comprising:
forming an image on a basis of the generated rendering data.

11. A non-transitory computer readable recording medium that records an information processing program executable by a processor of an image forming apparatus including a communication interface that receives printable data including a character code from a host device,
a memory that stores a character code attribute table recording the character code, the character code attribute table being configured to record a rendering attribute in association with the character code, and
the processor, the information processing program causing the processor to operate as a rendering module, wherein
the rendering module is configured to render a character identified by the character code in the printable data on a basis of the rendering attribute recorded in association with the character code in the character code attribute table to generate rendering data, and wherein the rendering module is further configured to
determine whether the character code attribute table records the rendering attribute or not,
where the rendering module determines that the character code attribute table records the rendering attribute, render the character identified by the character code on a basis of the rendering attribute recorded in the character code attribute table, and
where the rendering module determines that the character code attribute table records no rendering attribute, and where the printable data further includes a rendering attribute, render the character identified by the character code on a basis of the rendering attribute in the printable data.

12. The non-transitory computer readable recording medium according to claim 11, wherein
the memory stores the character code attribute table of each of a plurality of fonts,
the printable data specifies one or more fonts, and
the rendering module is configured to
determine whether the character code attribute table of each of the one or more fonts specified in the printable data records the rendering attribute or not,
where the rendering module determines that the character code attribute table of a particular font records the rendering attribute, render the character identified by the character code, to which the particular font is specified, on a basis of the rendering attribute recorded in the character code attribute table, and
where the rendering module determines that the character code attribute table of another font records no rendering attribute, and where the printable data further includes a rendering attribute, render the character identified by the character code, to which the another font is specified, on a basis of the rendering attribute in the printable data.

13. The non-transitory computer readable recording medium according to claim 11, wherein
the character code attribute table
records the rendering attribute in association with some character codes, and
records no rendering attribute in association with other character codes, and
the rendering module is configured to
render a character identified by the character code in association with the rendering attribute on a basis of the rendering attribute recorded in the character code attribute table, and
where the printable data further includes a rendering attribute, render a character identified by the character code in association with no rendering attribute on a basis of the rendering attribute in the printable data.

14. The non-transitory computer readable recording medium according to claim 11, wherein
the rendering module is configured to, where the printable data further includes a rendering attribute, generate the rendering data not on a basis of the rendering attribute in the printable data but on a basis of the rendering attribute recorded in the character code attribute table.

15. The non-transitory computer readable recording medium according to claim 11, wherein
the processor further operates as a video module configured to form an image on a basis of the rendering data generated by the rendering module.

* * * * *